June 20, 1944.  J. C. TRAVILLA, JR., ET AL  2,352,139
RAILWAY VEHICLE AND BRAKE ASSEMBLY
Filed Oct. 10, 1941  5 Sheets-Sheet 1
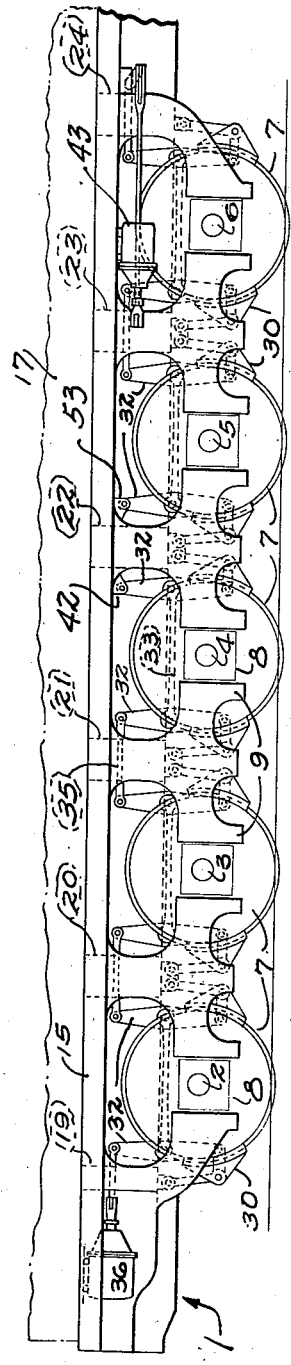
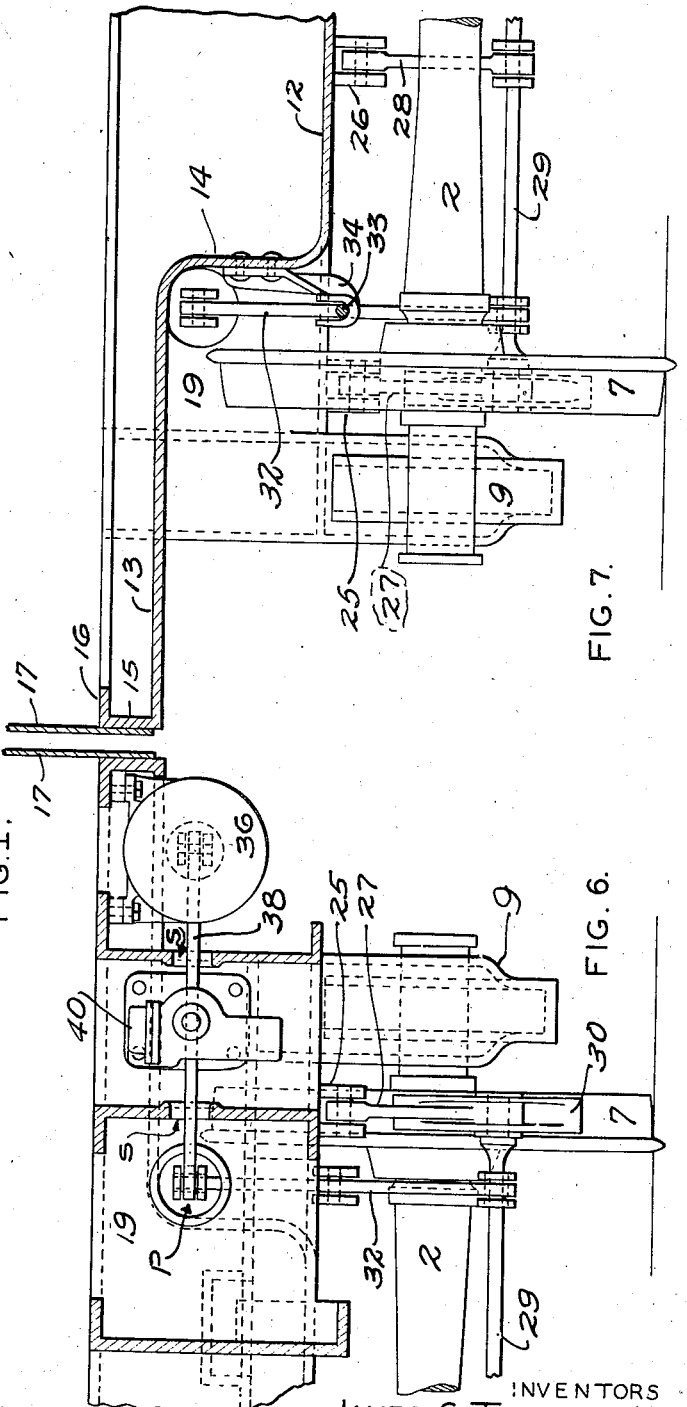
INVENTORS
JAMES C. TRAVILLA, JR.
EDWIN C. JACKSON
BY Rodney Bedell
ATTORNEY

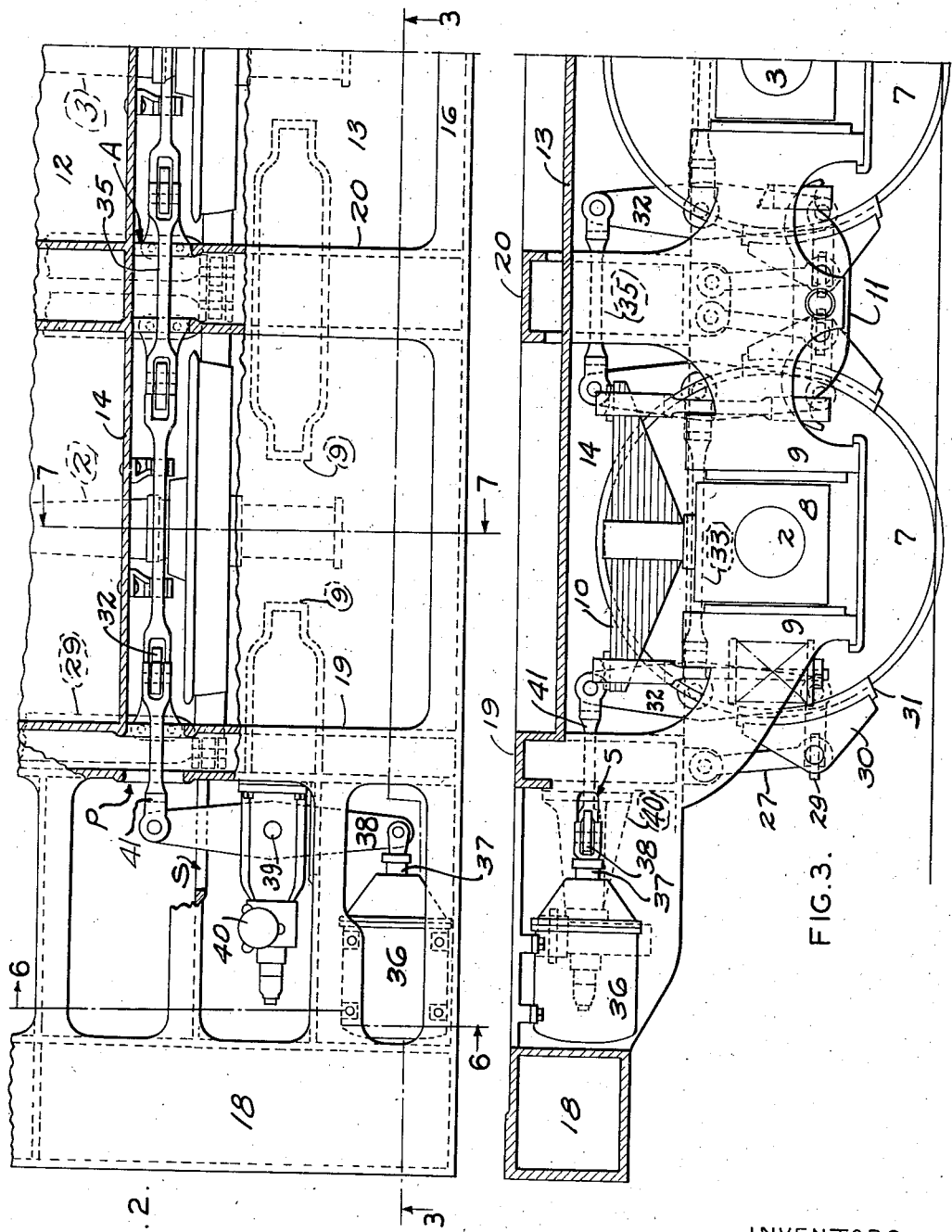
INVENTORS
JAMES C. TRAVILLA, JR.
EDWIN C. JACKSON
BY Rodney Bedell
ATTORNEY

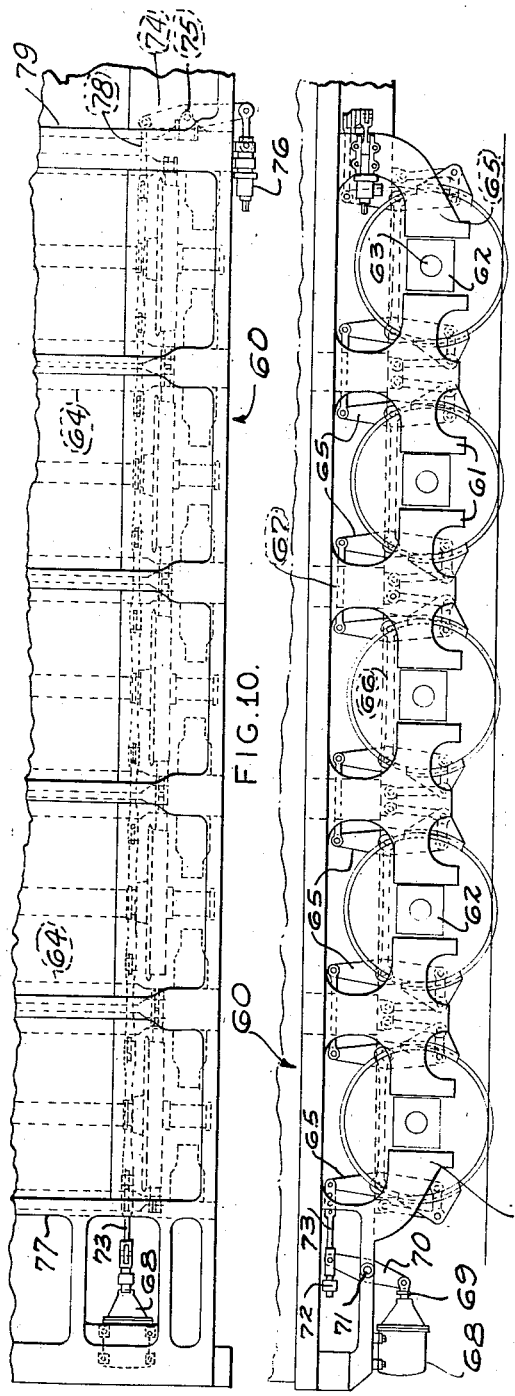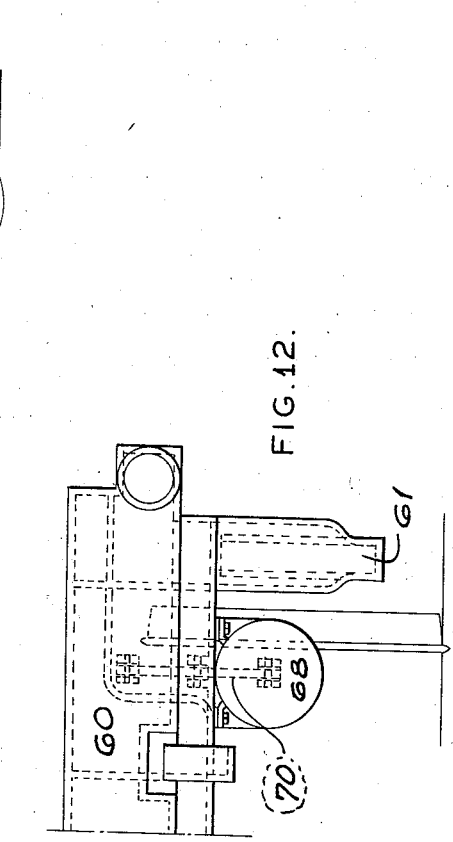

Patented June 20, 1944

2,352,139

UNITED STATES PATENT OFFICE 2,352,139

RAILWAY VEHICLE AND BRAKE ASSEMBLY

James C. Travilla, Jr., Philadelphia, Pa., and Edwin C. Jackson, Clayton, Mo., assignors to General Steel Castings Corporation, Granite City, Ill., a corporation of Delaware Application October 10, 1941, Serial No. 414,440

4 Claims. (Cl. 188—46)

The invention relates to the assembly of a railway vehicle underframe with its running gear and brake gear and is particularly adapted for use in heavily loaded vehicles, such as locomotive tenders, although not limited to such vehicles, in which a series of wheeled axles are journaled in the vehicle underframe and the latter require high capacity brakes in view of the weight of the vehicle and its load and the increased speeds at which railway rolling stock is being operated.

One object of the invention is to provide adequate braking capacity for a series of wheeled axles journaled in the underframe with the wheels of successive axles in close proximity to each other.

Another object of the invention is to arrange the foundation brake gear of such a vehicle at a high level relative to a substantial part of the underframe so as to permit the location of the latter at a low level relative to the rail without interference with the brake gear and thereby decrease generally the height of the underframe above the rail.

Another object of the invention is to permit the downward extension of the tank portion of a tender vehicle below the tops of wheels, mounted on axles journaled in the underframe, to increase the tender capacity, and to lower its center of gravity without interfering with the mounting and operation of adequate brake gear.

These and other detailed objects of the invention as will appear from the following description are attained by the structure illustrated in the accompanying drawings in which—

Figure 1 is a side view of a substantial portion of a locomotive tender embodying the invention.

Figure 2 is a top view of one side of one end of the underframe and brake gear, the same being sectioned in part to more clearly illustrate the structure, and is drawn to a larger scale than Figure 1.

Figure 3 is a longitudinal vertical section taken on the line 3—3 of Figure 2.

Figure 4:
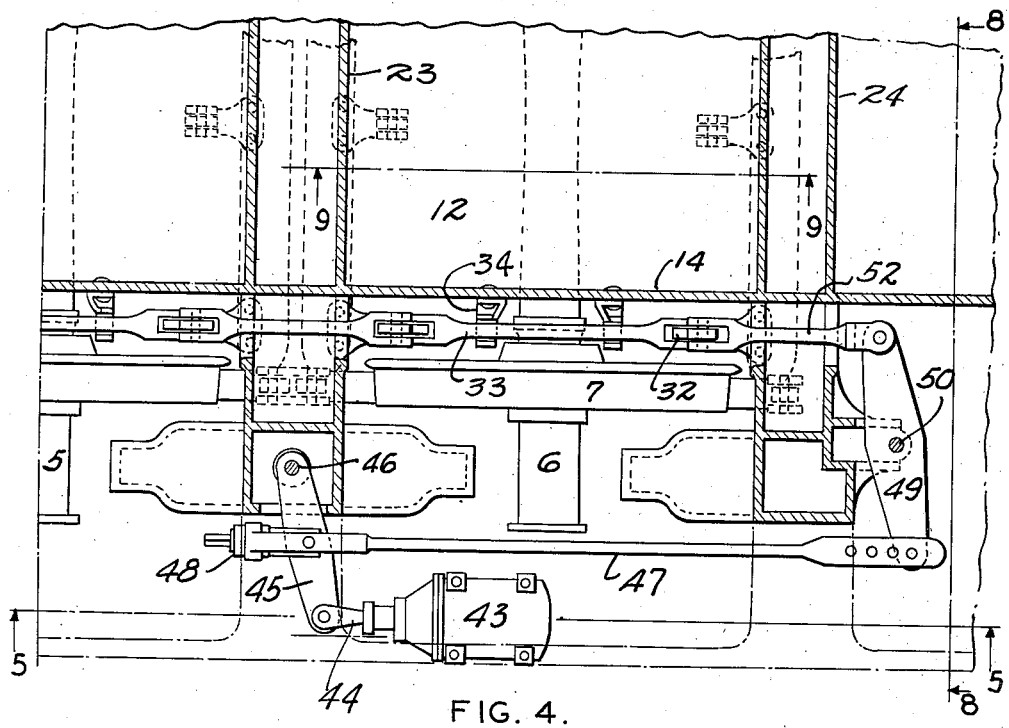

Figure 4 corresponds to Figure 2 but illustrates a portion of the underframe and associated parts spaced from that shown in Figure 2, part of the structure being illustrated in broken lines to more clearly illustrate the parts beneath.

Figure 5:
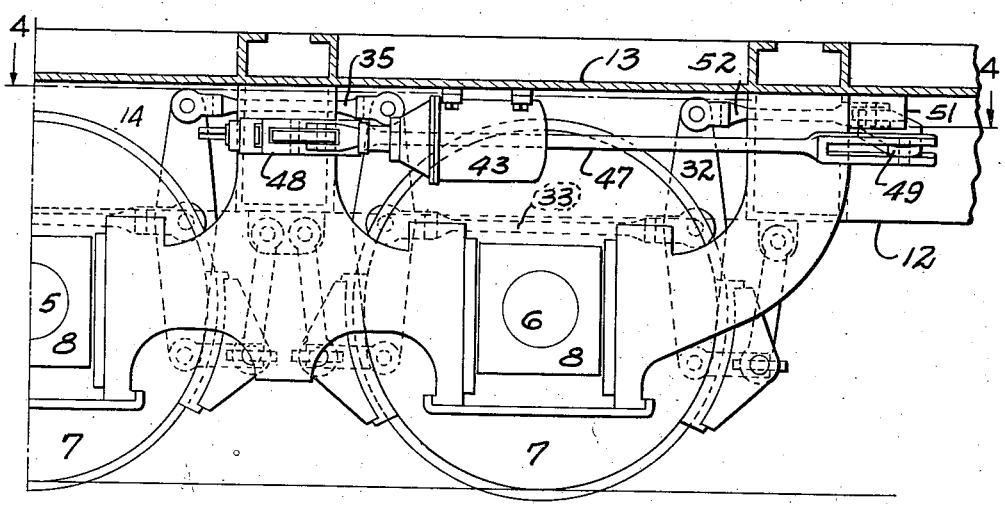
Figure 9:
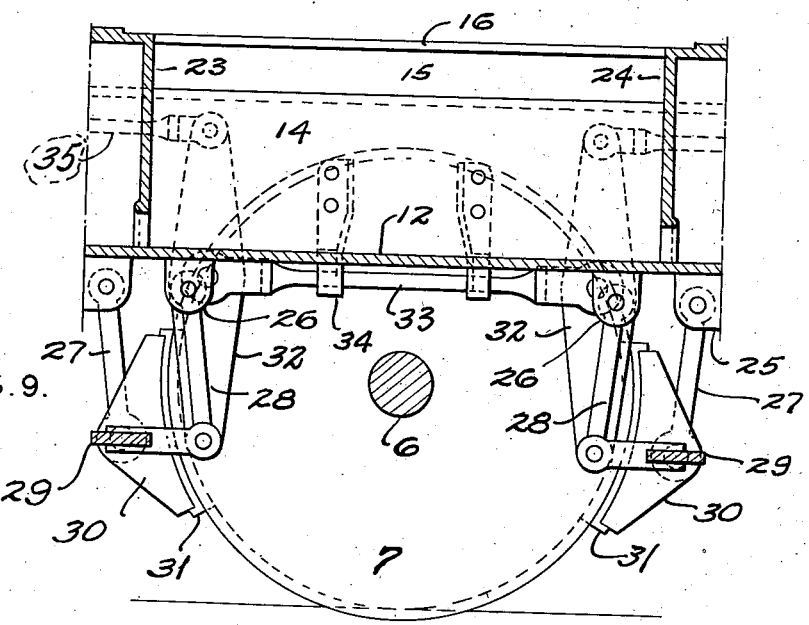

Figures 5 and 9 are longitudinal vertical sections taken on the corresponding section lines of Figure 4.

Figures 6 and 7 are vertical transverse sections taken on the corresponding section lines of Figure 2.

Figure 8:
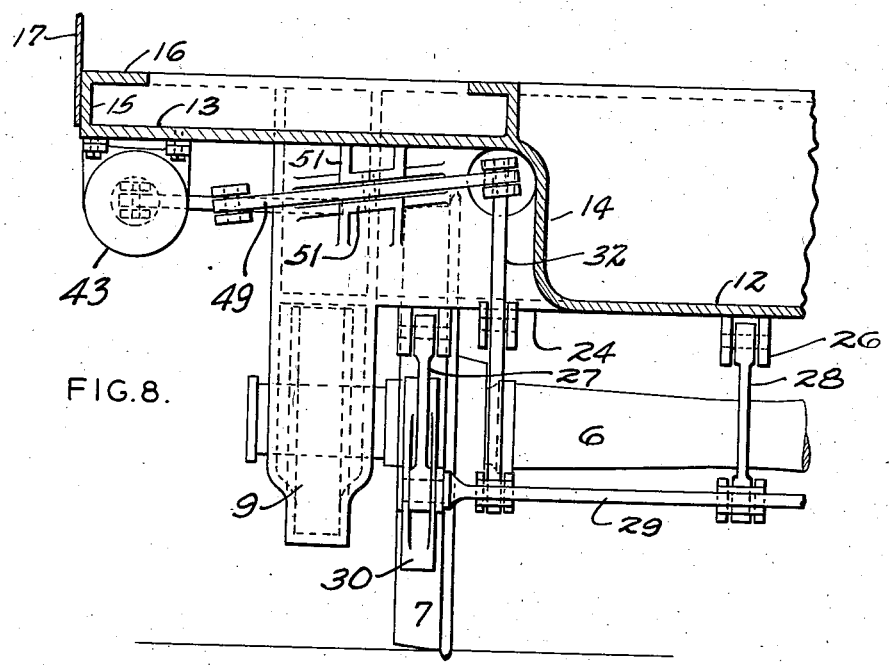

Figure 8 is a vertical section taken on the corresponding section line of Figure 4.

Figure 10 is a top view of one-half of the major portion of a vehicle underframe with associated running gear and brake gear and illustrating another form of the invention.

Figure 11 is a side view of the structure shown in Figure 10.

Figure 12 is a view of the left hand end of the structure shown in Figures 10 and 11.

The structure illustrated in Figures 1–9 comprises the major portion of a locomotive tender underframe 1 supported by a series of five wheeled axles 2, 3, 4, 5 and 6, each mounting wheels 7 and including journals provided with bearings in boxes 8 which are slidable vertically between legs 9 of pedestal jaws forming integral parts of the underframe. A series of springs 10 and equalizers 11 (Figure 3) are carried by the boxes and are secured to the underframe in the usual manner and preferably form a continuous equalizing spring system for each side of the vehicle.

The right hand end of the underframe (not shown) may be supported upon a swiveling truck such as is well known in the art and forms no part of the present invention.

This general arrangement of an underframe mounted upon a series of wheeled axles journaled in the underframe and upon a swiveling truck is more fully detailed and described in an earlier application of the present inventors filed February 21, 1938, Serial No. 191,674, Patent No. 2,274,-757, Mar. 3, 1942.

The present underframe comprises a one-piece casting which includes a horizontally disposed web forming the bottom of the tender tank. The central portion 12 of the web extends between the wheels at opposite sides of the vehicle at a substantially lower level than the tops of the wheels and approaches the axles. The side portions 13 of the web extend outwardly above the level of the tops of the wheels. Web portions 12 and 13 merge in an intermediate vertical web 14.

The outer sides of portions 13 terminate in upright and horizontal elements 15 and 16 to form side sills for the underframe to which are secured, as by welding or riveting, upright plates 17 forming the major portion of the sides of the tender tank.

The underframe includes a box section end sill 18 and a plurality of transverse vertical webs forming box section transoms 19, 20, 21, 22, 23 and 24, and these transoms extend laterally of the vehicle beyond longitudinal vertical webs 14, and the pedestal legs 9 depend from the transoms.

Depending from transoms 19, 20, 21, 22, 23 and 24 are brackets 25 and 26 from which are suspended brake hangers 27 and balance hangers 28 respectively which carry brake beams 29 extending between wheels at opposite sides of the vehicle and mounting the usual brake heads 30 and shoes 31 for application to the wheel treads.

Upright levers 32 are pivotally connected to beams 29 and extend upwardly therefrom alongside of underframe web 14. The levers 32, opposing each other adjacent each wheel, are connected intermediate their ends and are supported by a rod 33 slidable in brackets 34 secured to the underframe (Figures 7 and 9).

Preferably the wheels at the corresponding ends of axles 2, 3 and 4 are provided with a single brake system and the wheels at the corresponding ends of axles 5 and 6 are provided with a separate brake system. The upper ends of adjacent levers between axles 2, 3 and 4 are connected by rods 35 extending through apertures A in vertical webs of transoms 20 and 21.

At the left hand end of the vehicle (Figures 2 and 3) a power device, here indicated as a fluid pressure cylinder 36, is mounted on the underside of the underframe adjacent to end sill 18, and its piston rod 37 is pivotally connected to the outer end of a horizontally disposed power lever 38 which extends through slots S in the adjacent vertical webs of the underframe and which is fulcrumed at 39 to an automatic slack adjustor 40 mounted on cross transom 19.

A rod 41 is secured to the other end of lever 38 and extends through openings P in the vertical webs of transom 19 and is connected to the upper end of adjacent brake lever 32. The brake lever 32, at the opposite end of the interconnected series of levers for the brakes of the wheels on the three axles 2, 3 and 4, is a dead lever fulcrumed to a suitable bracket 42 (Figure 1) on the underframe.

Another power device 43 (Figures 4 and 5) is secured to the underside of the underframe abreast of the right hand axle 6 and its piston rod 44 is connected to one end of a power lever 45 fulcrumed at 46 to the underframe.

A rod 47, provided with a slack adjustor 48, connects lever 45 and one end of a lever 49 fulcrumed at 50 to brackets 51 on transom 24, and the opposite end of the lever is connected by a rod 52 to the adjacent brake lever 32. The brake lever 32, at the opposite end of the interconnected series of levers for the brakes of the wheels on the two axles 5 and 6, is a dead lever fulcrumed to a suitable bracket 53 (Figure 1) on the underframe.

Transoms 23 and 24 are apertured to accommodate lever 45 and connecting rod 52, as clearly shown in Figure 4.

It will be understood that the wheel, brake, interconnected levers and power device arrangement shown is duplicated at the opposite side of the vehicle and that each brake system is operated independently of the other brake systems except as brake beams 29, extending transversely of the vehicle, connect the opposite brake systems. However, these brake beams do not transfer any appreciable pull from one power device to the brakes at the opposite side of the vehicle.

The brakes may be provided with safety devices, guides, release springs and other associated parts in general use as is well understood in the art but omitted from the drawings as they form no part of the present invention.

The construction of the underframe provides for a central portion extending to a lower level than would be practical if the brake gear were carried along the center of the underframe, or if it were necessary to extend operating levers between braking elements applied to wheels at opposite sides of the vehicle when the axles are journaled in the underframe. The vertical offsetting of the bottom of the underframe provides a satisfactory pocket or recess over the wheels and extending outwardly beyond the same for mounting the brake gear so that it is all fairly accessible and the power devices and slack adjustors are readily accessible for application, inspection and removal.

Figures 10, 11 and 12 illustrate an axle, wheel and underframe structure which is substantially identical to that shown in Figures 1-9 but the brake arrangement, although similar, differs somewhat from that previously described in that a single brake system is shown for all of the five wheels at one side of the vehicle.

As indicated, the underframe 60 is provided with rigid depending pedestal legs 61 slidably receiving between them the journal boxes 62 mounted on the axles 63 and supporting the underframe by a spring equalizing system (not shown) as indicated in Figure 3.

Brake beams 64, brake levers 65 and connecting rods 66 and 67 correspond to the similar parts previously described.

A single power device 68 is secured to the left hand end of the underframe with its piston rod 69 connected to the lower end of an upright power lever 70 fulcrumed at 71 to the underframe and positioned in substantially the same longitudinal vertical plane as levers 65.

The upper end of lever 70 is operatively connected to the left hand lever 65 through a slack adjustor 72 and a rod 73 which extends through the left hand transom 77. The brake lever 65 at the other end of the system is connected by a rod 78, extending through transom 79, to one end of a horizontally disposed lever 74 fulcrumed to the underframe at 75 with its other end connected to a slack adjustor 76.

In this construction a substantial portion of the brake gear is received in the downwardly and outwardly opening recess provided in the underframe at the side of the deepened central portion and beneath the shallower side portion, thus securing the general objectives and possessing the advantages previously referred to.

It will be understood that the arrangement of the parts and the details of construction may be varied substantially otherwise than as described by those skilled in the art without departing from the spirit of the invention, and the exclusive use of such modifications as come within the scope of the claims is contemplated.

What is claimed is:

1. In a railway vehicle, an underframe having a transverse transom, said underframe having depending pedestal jaws at one side of said transom, axles journaled in said pedestal jaws, wheels on said axles, brake gear for said wheels including brake shoes, a lever connected to said shoes and extending upwardly above the level of the bottom of said transom at the same side of said transom as said pedestals, and a power device mounted on said underframe at the other side of said transom, there being a connection between said lever and power device and extending through said transom.

2. In a railway vehicle, an underframe having vertical webs extending transversely and longitudinally of the vehicle and having depending pedestal jaws, axles journaled in said pedestal jaws, wheels on said axles, the wheels of successive axles being in close proximity to each other, clasp brake gear for said wheels including brake shoes for engaging said wheels, and a lever connected to said shoes and extending upwardly above the level of the bottom of said vertically disposed webs at one side thereof, and a power device mounted on said underframe at the other side of said webs, there being members connecting said power device and the upper end of said lever and extending horizontally through said transversely and longitudinally extending webs.

3. In a railway vehicle, a series of axles with wheels, journal boxes on said axles, a rigid underframe forming a tank bottom between wheels at opposite sides of the vehicle and extending substantially from end to end of the vehicle and having pedestals receiving said boxes, clasp brake gear for the wheels at one side of the vehicle and including brake shoes for engaging the wheels, means interconnecting said brake shoes, and a power device operatively connected to said interconnected brake shoes, said brake shoes, supports and device being in substantial alignment longitudinally of the vehicle and carried by the underframe inwardly of the ends of the underframe and of the adjacent side of the underframe.

4. In a railway vehicle having a series of axles and wheels and a rigid underframe carried on the axles and provided with depending pedestals in which the axles are journaled and including tank wall forming portions extending from side to side of the vehicle over and beyond said wheels and with a depressed central portion below the level of the tops of the wheels, brakes for wheels at one side of the vehicle including shoes arranged for application to the wheels, levers and connection rods for actuating the shoes, a power device between the end of the underframe and an adjacent wheel, and means operatively connecting the power device to said levers, said shoes, levers, power device and means being in substantial alignment longitudinally of the vehicle and carried by the frame inwardly from the ends and the adjacent side thereof.

JAMES C. TRAVILLA, Jr.
EDWIN C. JACKSON.